US009710928B2

(12) United States Patent
Atsmon et al.

(10) Patent No.: US 9,710,928 B2
(45) Date of Patent: *Jul. 18, 2017

(54) SYSTEM AND PROCESS FOR AUTOMATICALLY FINDING OBJECTS OF A SPECIFIC COLOR

(71) Applicants: Alon Atsmon, Ganey-Tikva (IL); Dan Atsmon, Rehovot (IL)

(72) Inventors: Alon Atsmon, Ganey-Tikva (IL); Dan Atsmon, Rehovot (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/230,433

(22) Filed: Aug. 7, 2016

(65) Prior Publication Data

US 2016/0343149 A1 Nov. 24, 2016

Related U.S. Application Data

(63) Continuation of application No. 14/833,099, filed on Aug. 23, 2015, now Pat. No. 9,412,182, which is a (Continued)

(51) Int. Cl.
*G06K 9/00* (2006.01)
*G06T 7/40* (2017.01)
(Continued)

(52) U.S. Cl.
CPC .......... *G06T 7/408* (2013.01); *G06F 17/3025* (2013.01); *G06K 9/4652* (2013.01);
(Continued)

(58) Field of Classification Search
CPC G06K 9/6201; G06K 9/4652; G06F 17/3025; H04N 1/6058; H04N 1/60;
(Continued)

(56) References Cited

U.S. PATENT DOCUMENTS 7,522,768 B2    4/2009   Bhatti et al.
8,369,616 B2 *   2/2013   Marchesotti ......... G06K 9/4652
                                                                                    382/162

(Continued)

FOREIGN PATENT DOCUMENTS

WO   WO 2004/027695   4/2004
WO   WO 2009/137830   11/2009

OTHER PUBLICATIONS

Applicant-Initiated Interview Summary Dated Feb. 19, 2016 From the US Patent and Trademark Office Re. U.S. Appl. No. 14/833,099.

(Continued)

*Primary Examiner* — Ali Bayat

(57) ABSTRACT

A computer implemented method, system and computer program product for identifying the Main Colors and the matching colors of a visual object, and then viewing on a mobile device select items comprising the matching colors, such as from a merchant's catalogue. A visual object is analyzed for color content, and the results are stored on a system database located on the device or on a remote server. The color analysis of the objects comprise advanced image processing techniques, such as Main Color extraction using color space transformation comprising HSV, RGB and CYMK to map between pixels in the image. The user can subsequently view a display on their mobile identifying the visual object's Main Colors and at least one Harmonic Color; and then select and view all items (i.e. products in a database) comprising one Harmonic Color, and/or all items of a specific type and Harmonic Color.

20 Claims, 9 Drawing Sheets

Related U.S. Application Data continuation of application No. 14/292,914, filed on Jun. 1, 2014, now Pat. No. 9,117,143, which is a continuation of application No. 13/356,815, filed on Jan. 24, 2012, now Pat. No. 8,744,180.

(60) Provisional application No. 61/438,993, filed on Feb. 3, 2011, provisional application No. 61/435,358, filed on Jan. 24, 2011.

(51) Int. Cl.
| | | |
|---|---|---|
| *G06Q 10/00* | (2012.01) | |
| *G06F 17/30* | (2006.01) | |
| *G06K 9/46* | (2006.01) | |
| *G06K 9/62* | (2006.01) | |
| *H04N 5/232* | (2006.01) | |
| *G06T 7/90* | (2017.01) | |

(52) U.S. Cl.
CPC .......... *G06K 9/6201* (2013.01); *G06Q 10/00* (2013.01); *G06T 7/90* (2017.01); *H04N 5/23229* (2013.01); *G06T 2207/10024* (2013.01)

(58) Field of Classification Search
CPC ................. H04N 1/64; H04N 1/32106; H04N 2201/325; G06T 11/60; G06T 2207/20021; G06T 2207/20144; G06T 2207/30108; G06T 7/0081
See application file for complete search history.

(56) References Cited

U.S. PATENT DOCUMENTS

| | | | |
|---|---|---|---|
| 8,744,180 | B2 | 6/2014 | Atsmon et al. |
| 2003/0208754 | A1* | 11/2003 | Sridhar ................. G06Q 30/02 725/34 |
| 2005/0156942 | A1 | 7/2005 | Jones |
| 2008/0046410 | A1* | 2/2008 | Lieb .................... G06F 17/3025 |
| 2009/0024580 | A1* | 1/2009 | Obrador ............ G06F 17/30256 |
| 2009/0202147 | A1 | 8/2009 | Sambongi |
| 2009/0252371 | A1 | 10/2009 | Rao |
| 2009/0290762 | A1* | 11/2009 | Guan ................. G06K 9/00362 382/107 |
| 2013/0022264 | A1 | 1/2013 | Atsmon et al. |
| 2014/0270509 | A1 | 9/2014 | Atsmon et al. |
| 2015/0363945 | A1 | 12/2015 | Atsmon et al. |

OTHER PUBLICATIONS

Notice of Allowance Dated Apr. 1, 2016 From the US Patent and Trademark Office Re. U.S. Appl. No. 14/833,099.
Notice of Allowance Dated Apr. 20, 2015 From the US Patent and Trademark Office Re. U.S. Appl. No. 14/292,914.
Notice of Allowance Dated Jan. 31, 2014 From the US Patent and Trademark Office Re. U.S. Appl. No. 13/356,815.
Official Action Dated Dec. 22, 2015 From the US Patent and Trademark Office Re. U.S. Appl. No. 14/833,099.
Official Action Dated Sep. 22, 2014 From the US Patent and Trademark Office Re. U.S. Appl. No. 14/292,914.
Official Action Dated Jul. 31, 2013 From the US Patent and Trademark Office Re. U.S. Appl. No. 13/356,815.

\* cited by examiner

SYSTEM AND PROCESS FOR AUTOMATICALLY FINDING OBJECTS OF A SPECIFIC COLOR

RELATED APPLICATIONS

This application is a continuation of U.S. patent application Ser. No. 14/833,099 filed on Aug. 23, 2015, which is a continuation of U.S. patent application Ser. No. 14/292,914 filed on Jun. 1, 2014, now U.S. Pat. No. 9,117,143, which is a continuation of U.S. patent application Ser. No. 13/356,815 filed on Jan. 24, 2012, now U.S. Pat. No. 8,744,180, which claims the benefit of priority under 35 USC §119(e) of U.S. Provisional Patent Application Nos. 61/438,993 filed on Feb. 3, 2011 and 61/435,358 filed on Jan. 24, 2011. The contents of the above applications are all incorporated by reference as if fully set forth herein in their entirety.

FIELD AND BACKGROUND OF THE INVENTION

1. Technical Field

The present invention relates to systems and processes for automatically analyzing and matching object's colors using a digital image captured on an electronic communications device.

2. Discussion of the Related Art

The prior art discloses a number of color matching applications for use on mobile devices, such as to match colors of wall paints, furniture, clothing, etc. In most cases the user captures and stores an image of the item with their mobile device camera or laptop webcam. They then capture another image at a store, and run a mobile application to compare the two images to determine if their colors match.

The mobile application may run the comparison in a variety of manners. For example, the device may show the two images side-by-side so that the user can subjectively make the decision. Or the mobile device can conduct an image analysis to determine to what degrees they match. For example, United States Patent Application 20090252371 entitled "Mobile device with color detection capabilities" will breakdown the component colors into percentages (i.e. "Red: 10%, Blue 47%, Green 43% and Purchase Item Image: Red: 12%, Blue 47%, Green 41%"). It will then display a closeness of color match based upon a preset overall percentage margins such as "Overall Result: Compares within 10%, Close Enough" or "Overall Result: Compares within 10%, Almost the Same" or "Overall Result: Compares within 40%, Does not Match".

The prior art also discloses the use of a remote server to analyze a color match. For example, in 2008 Hewlett-Packard Laboratories launched a service using a mobile device photograph to enable a woman to select her hue of foundation makeup (See U.S. Pat. No. 7,522,768). The consumer takes a photograph of herself using a phone camera while holding a specially designed color chart. The image is then sent by the consumer via multimedia messaging service (MMS) to an advisory service host at a backend server. The system uses color science to correct the image color, image processing algorithms to locate and extract the face from the image, and statistical classifiers to determine the user's foundation makeup color with accuracy close to that of a makeup expert. The consumer then receives a SMS (Short Message Service) text message containing the foundation shade recommendation that best matches her complexion.

The prior art does not, though, disclose color analysis of images captured on a mobile device using various image processing algorithms wherein the user can select what type of colors hues they will receive from the system, such as analogous, triadic, tetradic, square, complementary, and split-complementary colors.

SUMMARY OF THE INVENTION

The present invention comprises a computer implemented method, system and computer program product for identifying matching colors of a visual object captured in a digital image on a mobile device, such as with a mobile phone camera or a laptop webcam. The visual object is compared to a reference object that the mobile device user or another entity has previously captured, analyzed for color content, and stored on a system database. The user can then be provided a display on their mobile identifying the primary colors in the visual object, and other colors that would coordinate with the object for a "color match", such as analogous, triadic, tetradic, square, complementary, and split-complementary colors.

In a preferred embodiment of the present invention, the user captures an image on their mobile device of a reference object (i.e. furniture, clothing, wall paint, etc. . . . ) that they wish to color coordinate with a similar object (i.e. pillows for furniture, shoes for clothing, wall paper for wall paint, etc. . . . ). The system and software will conduct a color analysis, which will identify its Main Colors (i.e., Base, Primary, Secondary and Tertiary Colors), of the reference object and optionally create a color harmonics of it. The system will query image database, then return and display matching color combinations and/or harmonics (such as analogous, triadic, tetradic, square, complementary, and split-complementary colors) based on the query, on the user's mobile device.

The computer implemented method as conducted by the software of the present invention comprise the steps of: 1) capturing an image on a terminal device, wherein the image are associated with a visual object; 2) conducting a color analysis, i.e. determining the Main Colors, on the reference image and optionally constructing a color wheel based on the analysis; 3) Querying an Image Database against the color analysis using one or more harmonics, wherein the user may manually select a particular type of harmonic; and, 4) electronically transmitting and displaying results to the terminal based on the image color analysis, e.g. Main Colors; wherein the results comprise all harmonics if the user did not select the particular type of harmonic in step (3).

The present invention uses various image enhancing and processing algorithms and techniques to detect and analyze the different color hues in a digital image, such as, HSV (Hue, Saturation, Value) color histograms, RGB color histograms, CYMK color histograms, and multi-space color clustering. The color analysis may also comprise, separating the object from its background, compensating for distortions such as shading and/or flash light, classifying each pixel to a predefined color set and finding the elements of the color set with the highest number of pixels.

Other aspects of the invention may include a system arranged to execute the aforementioned methods and a computer readable program to include a mobile application configured to execute the aforementioned methods. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE SEVERAL VIEWS OF THE DRAWING(S)

The present invention will now be described in the following detailed description of exemplary embodiments of the invention and with reference to the attached drawings, in which dimensions of components and features shown are chosen for convenience and clarity of presentation and are not necessarily shown to scale. Generally, only structures, elements or parts that are germane to the discussion are shown in the figure.

DESCRIPTION OF SPECIFIC EMBODIMENTS OF THE INVENTION

Figure 1:
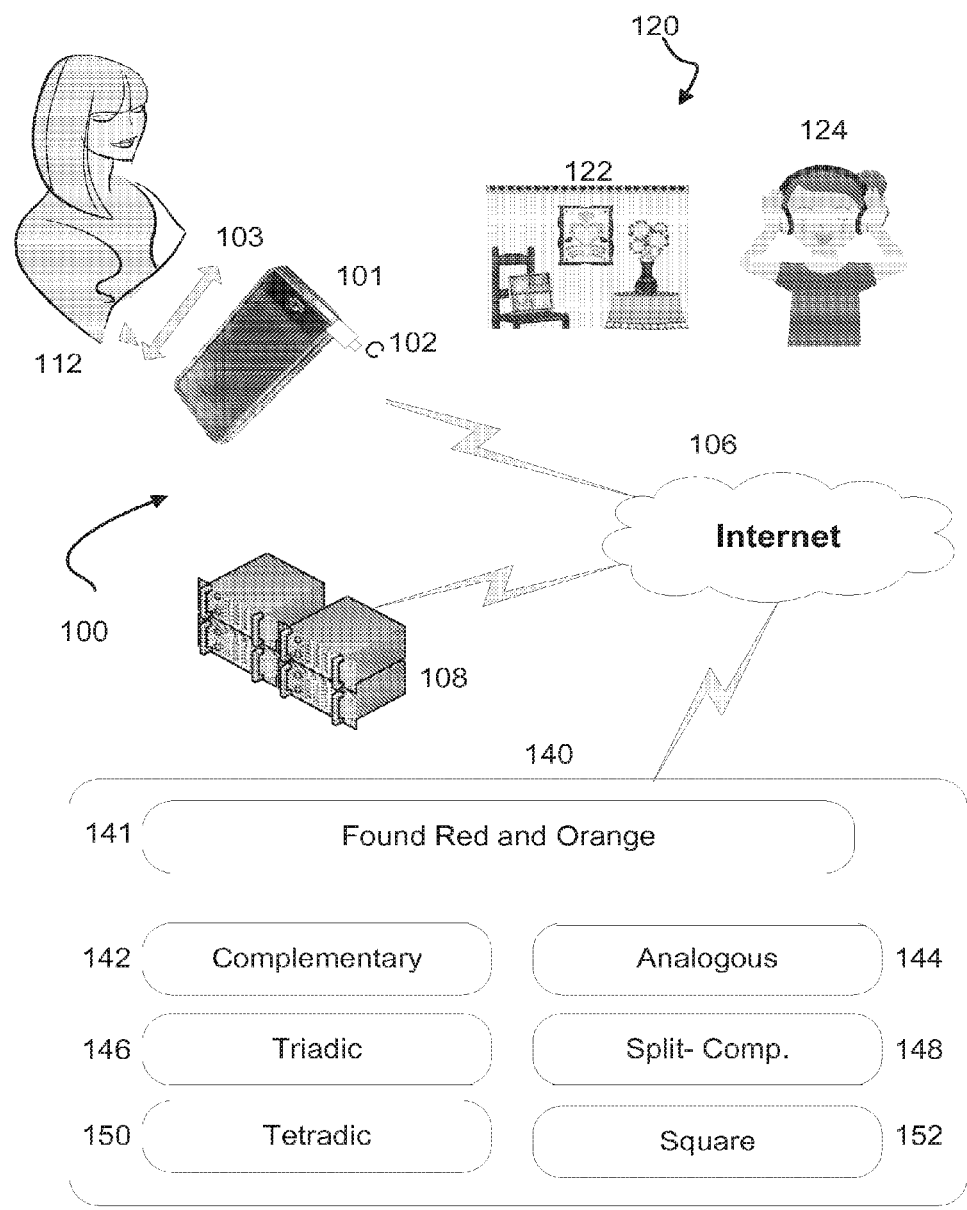
FIG. 1 is a scheme describing the system and process in accordance with an exemplary embodiment of the invention.

Provided herein is a detailed description of this invention. It is to be understood, however, that this invention may be embodied in various forms, and that the suggested (or proposed) embodiments are only possible implementations (or examples for a feasible embodiments, or materializations) of this invention. Therefore, specific details disclosed herein are not to be interpreted as limiting, but rather as a basis and/or principle for the claims, and/or as a representative basis for teaching one skilled in the art to employ this invention in virtually any appropriately detailed system, structure or manner.

Glossary of Terms

To facilitate understanding the present invention, the following glossary of terms is provided. It is to be noted that terms used in the specification but not included in this glossary are considered as defined according the normal usage of the computer science art, or alternatively according to normal dictionary usage.

The term "image" as used herein in this application is defined as visual representation that can be presented on two dimensional or three dimensional surfaces. Images can be taken in any part of the electromagnetic spectrum such as visible light, infrared, ultraviolet, X-rays, Terahertz, Microwaves, and Radio frequency waves. The reference images (i.e. color wheel) are stored in an "image database (DB)" on the system server or on the mobile device.

The term "photo" as used herein in this application is defined as image in the visible light.

The term "GPS" as used herein in this application, is defined as a system based on satellites that allows a user with a receiver to determine precise coordinates for their location on the earth's surface.

The term "GPU" as used herein in this application, is defined as an apparatus adapted to reduce the time it takes to produce images on the computer screen by incorporating its own processor and memory, having more than 16 CPU cores, such as GeForce 8800.

The term "Keypoint" as used herein in this application, is defined as interest points in an object. For example, in the SIFT framework, the image is convolved with Gaussian filters at different scales, and then the difference of successive Gaussian-blurred images are taken. Keypoints are then taken as maxima/minima of the Difference of Gaussians. Such keypoints can be calculated for the original image or for a transformation of the original image, such as an affine transform of the original images.

The term "Keypoint descriptor" as used herein in this application, is defined as a descriptor of a keypoint. For example, in the SIFT framework the feature descriptor is computed as a set of orientation histograms on neighborhoods. The orientation histograms are relative to the keypoint orientation and the orientation data comes from the Gaussian image closest in scale to the keypoint's scale. Just like before, the contribution of each pixel is weighted by the gradient magnitude, and by a Gaussian with $\sigma$ 1.5 times the scale of the keypoint. Histograms contain 8 bins each, and each descriptor contains an array of 4 histograms around the keypoint. This leads to a SIFT feature vector with ($4 \times 4 \times 8 = 128$ elements).

The term "Visual content item" as used herein in this application, is defined as an object with visual characteristics such as an image file like BMP, JPG, JPEG, GIF, TIFF, PNG files; a screenshot; A video file like AVI, MPG, MPEG, MOV, WMV, FLV files or a one or more frame of a video.

The term "visual object" as used herein in this application, is defined as a content that includes visual information such as visual content item, images, photos, videos, IR image, magnified image, an image sequence or TV broadcast.

The term "camera" as used herein in this application is defined as means of capturing a visual object.

The term "terminal" as used herein in this application is defined as an apparatus adapted to show visual content such as a computer, a laptop computer, mobile phone or a TV.

The term "visual similarity" as used herein in this application, is defined as the measure of resemblances between two visual objects that can be comprised of:

The fit between their color distributions such as the correlation between their HSV color histograms The fit between their texture The fit between their shapes The correlation between their edge histograms Face similarity Methods that include local descriptors such as Scale-invariant feature transform (SIFT), Affine-SIFT (ASIFT), Speeded Up Robust Feature (SURF), and Multi-Scale Retinex (MSR)

The term "Visual analysis" as used herein in this application, is defined as the analysis of the characteristics of visual objects such, as visual similarity, coherence, hierarchical organization, concept load or density, feature extraction and noise removal.

The term "Capturing data analysis" as used herein in this application, is defined as the analysis of capturing data such as:
  X-Y-Z coordinates
  3 angles
  Manufacturer
  Model
  Orientation (rotation) top-left
  Software
  Date and Time
  YCbCr Positioning centered
  Compression
  x-Resolution
  y-Resolution
  Resolution Unit
  Exposure Time
  FNumber
  ExposureProgram
  Exif Version
  Date and Time (original)
  Date and Time (digitized)
  ComponentsConfiguration Y Cb Cr
  Compressed Bits per Pixel
  Exposure Bias
  MaxApertureValue
  Metering Mode Pattern
  Flash fired or not
  Focal Length
  MakerNote
  FlashPixVersion
  Color Space
  PixelXDimension
  PixelYDimension
  File Source
  InteroperabilityIndex
  InteroperabilityVersion
  Derivates of the above such as acceleration in the X-axis The term "Service location" as used herein in this application, is defined as a physical place where objects can be serviced and/or fixed such as a mobile carrier service center.

The term "Location based analysis" as used herein in this application, is defined as analysis of local data such as GPS location, triangulation data, RFID data, and street address. Location data can for example identify the service location or even the specific part of the service location in which the visual object was captured.

The term "Color analysis" as used herein in this application, is defined as the combination of visual analysis, capturing data analysis, location based analysis and/or analysis of other data and analysis history to extract a color from a visual object. Color analysis can include the steps of separating the main object from its background, compensating for distortions such as shading and/or flash light, classifying each pixel to a predefined color set and finding the elements of the color set with the highest number of pixels.

The term "marketplace" as used herein in this application, is defined as a physical place where objects can be bought such as a bank, a change point, a supermarket, a convenience store and a grocery store.

Figure 3:
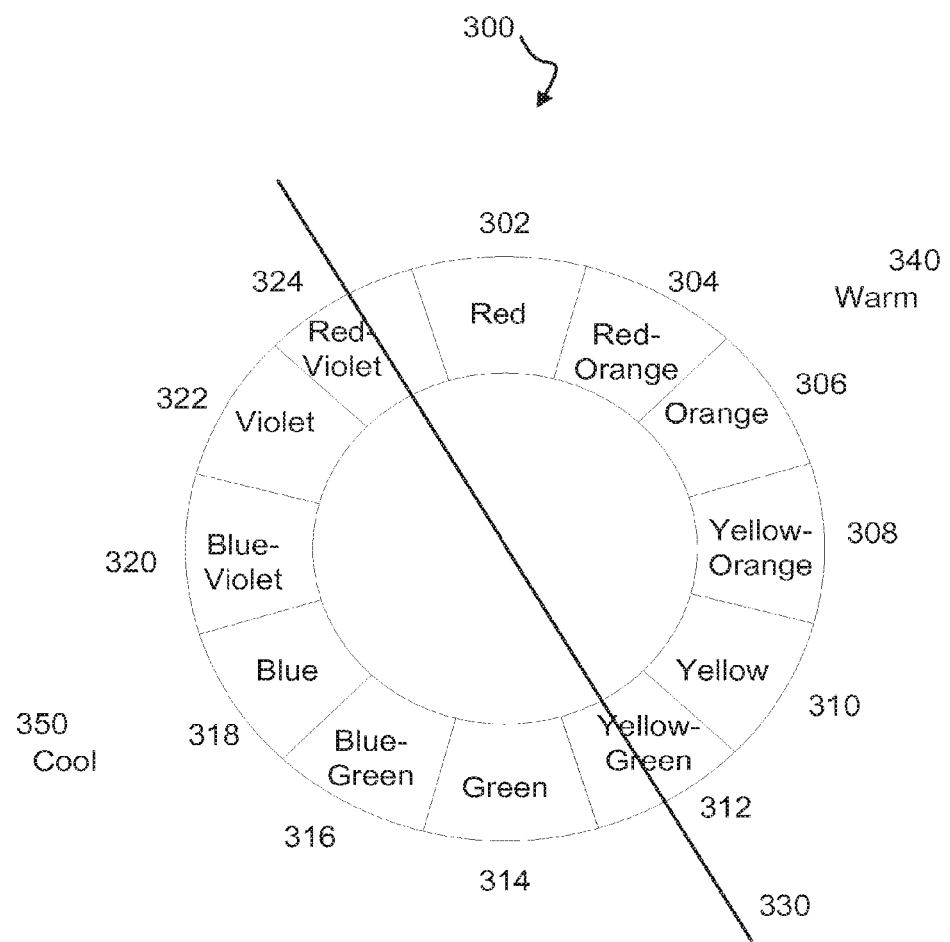
FIG. 3 is a scheme describing a color wheel in accordance with an exemplary embodiment of the invention.

The term "color wheel" as used herein in this application, and is further described in FIG. 3, is defined as an abstract illustrative organization of color hues around a circle that shows relationships between primary colors, secondary colors, complementary colors. In the RYB (or subtractive) color model, the primary colors are red, yellow and blue. The three secondary colors (green, orange and purple) are created by mixing two primary colors. Another six tertiary colors are created by mixing primary and secondary colors.

The term "color harmonies" as used herein in this application, is defined as color combinations that are considered especially pleasing. They consist of two or more colors with a fixed relation in the color wheel.

The term "color impact" as used herein in this application, is defined as the dynamic creation of a color wheel to match a visual object's Base, Primary, Secondary and Tertiary Colors.

The term "warm colors" as used herein in this application, is defined as vivid and energetic colors.

The term "cool colors" as used herein in this application, is defined as colors that give an impression of calm, and create a soothing impression. White, black and gray are considered to be neutral.

Figure 4:
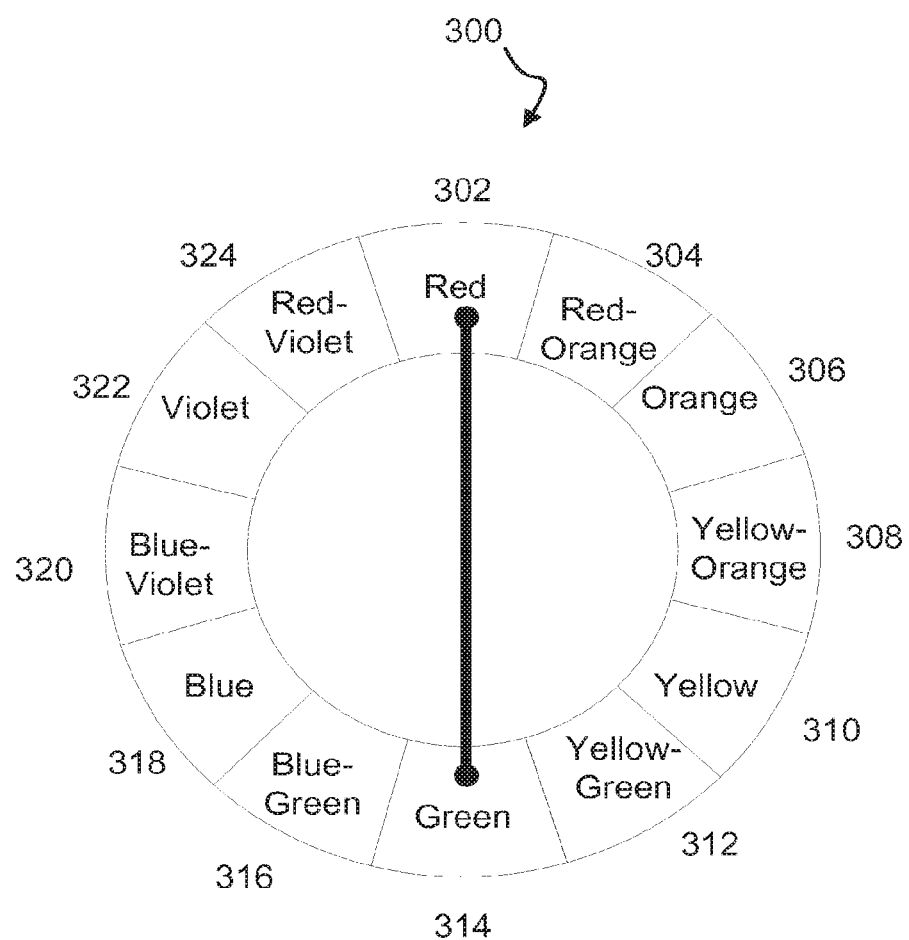
FIG. 4 is a scheme describing a selecting a complementary color in accordance with an exemplary embodiment of the invention.

The term "complementary colors" as used herein in this application, and is further shown on FIG. 4, is defined as colors that are opposite each other on the color wheel.

Figure 5:
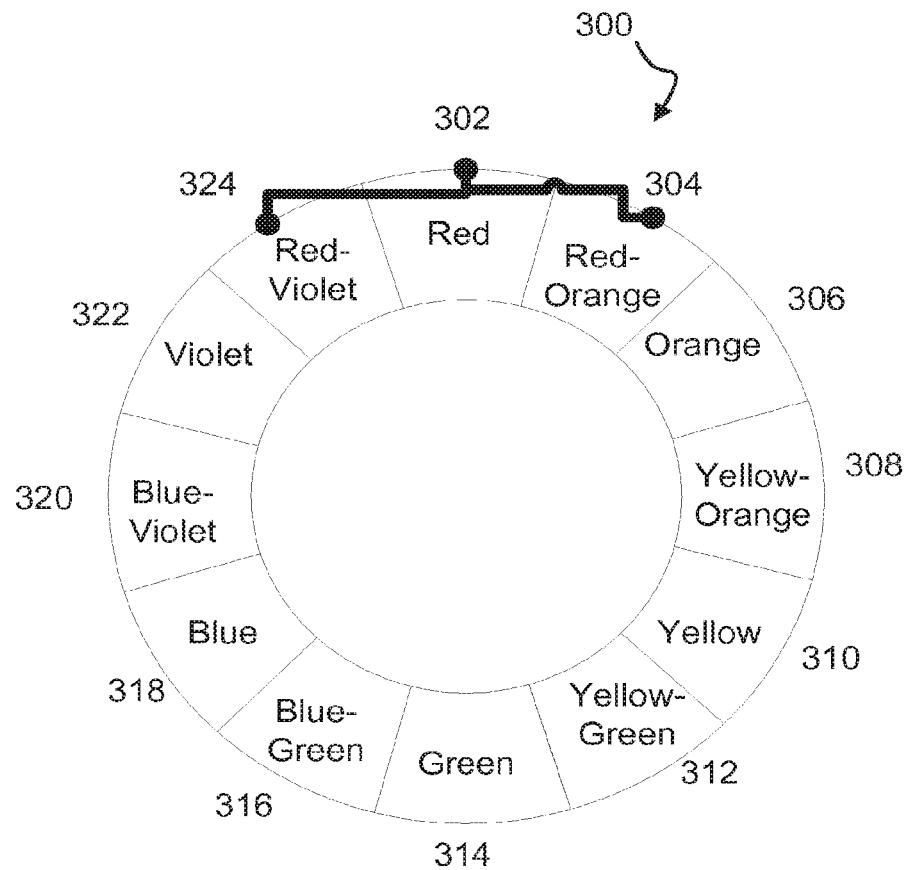
FIG. 5 is a scheme describing the selection of analogous colors in accordance with an exemplary embodiment of the invention.

The term "analogous colors" as used herein in this application, and is further shown on FIG. 5, is defined as colors that are next to each other on the color wheel.

Figure 6:
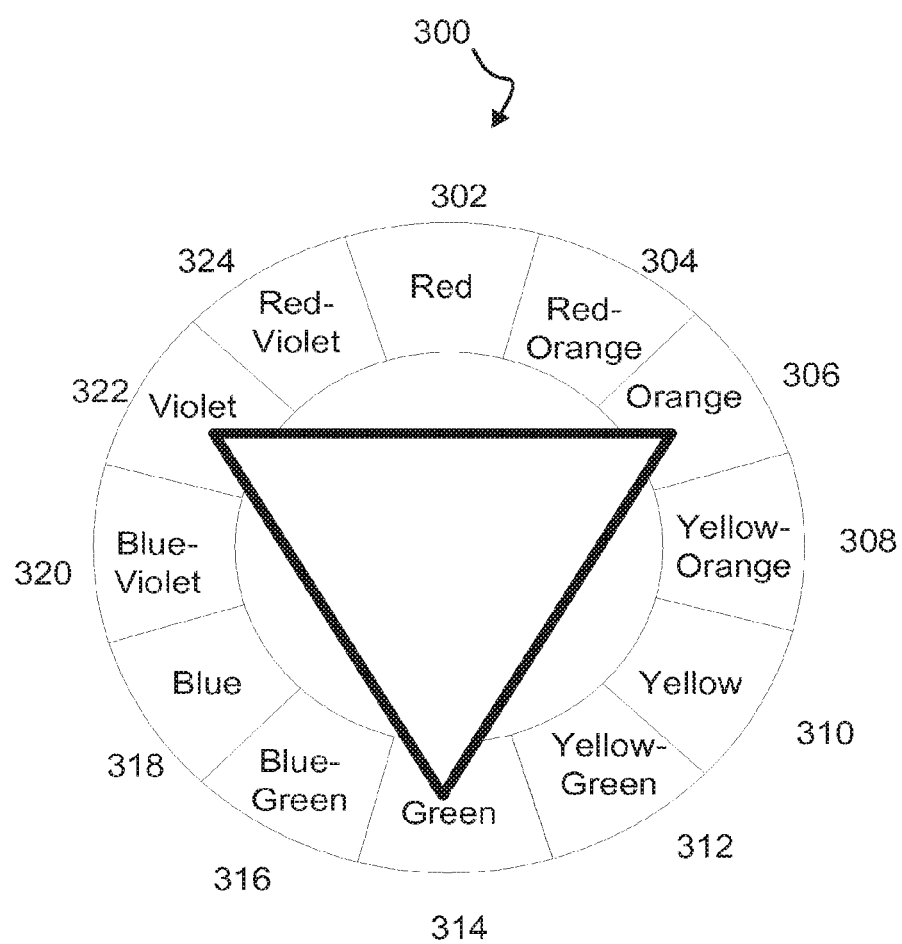
FIG. 6 is a scheme describing the selection of triadic colors in accordance with an exemplary embodiment of the invention.

The term "triadic colors" as used herein in this application, and is further shown on FIG. 6, is defined as colors that are colors that are evenly spaced around the color wheel.

Figure 7:
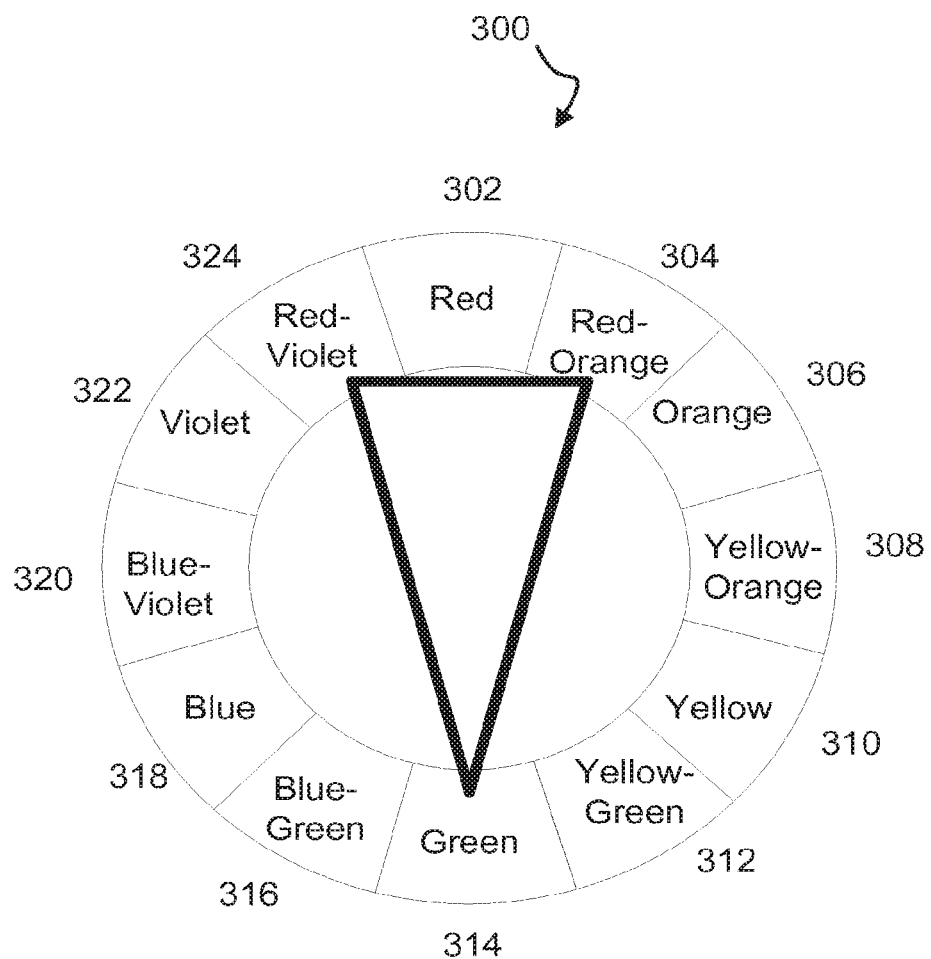
FIG. 7 is a scheme describing the selection of split complementary colors in accordance with an exemplary embodiment of the invention.

The term "split-complementary colors" as used herein in this application, and is further shown on FIG. 7, is defined as set of base color on the color wheel and two colors adjacent to its complementary color.

Figure 8:
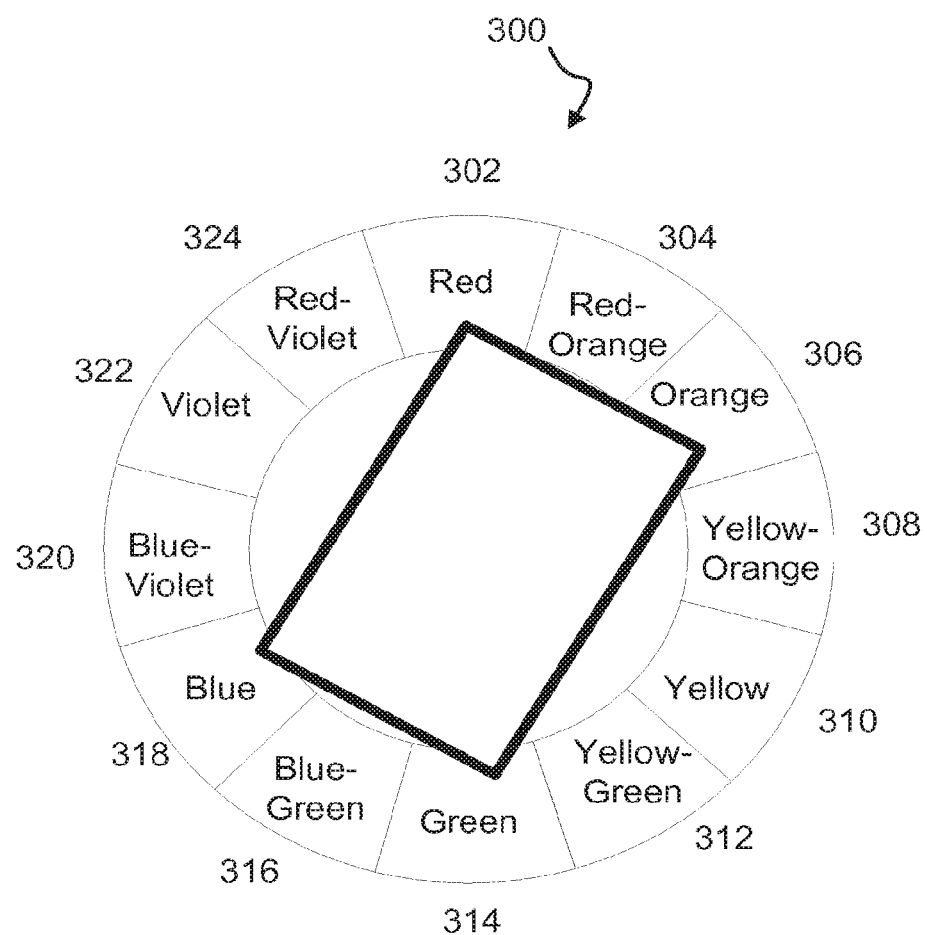
FIG. 8 is a scheme describing the selection of tetriadic colors in accordance with an exemplary embodiment of the invention.

The term "tetradic colors" as used herein in this application, and is further shown on FIG. 8, is defined as four colors arranged into two complementary pairs on the color wheel.

Figure 9:
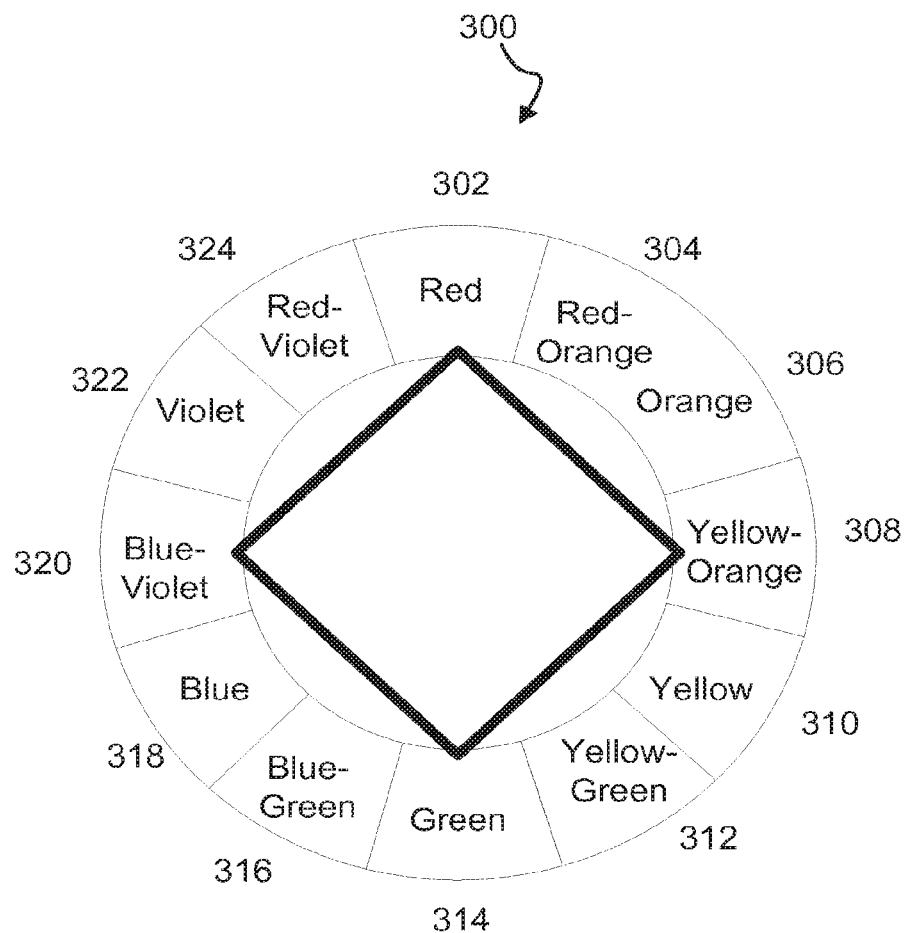
FIG. 9 is a scheme describing the selection of square colors in accordance with an exemplary embodiment of the invention.

The term "square colors" as used herein in this application, and is further shown on FIG. 9, is defined as four colors arranged into two complementary pairs on the color wheel, with all four colors spaced evenly around the color wheel.

System for Analyzing Color Images

FIG. 1 is a scheme describing the system and process in accordance with an exemplary embodiment of the invention.

System 100 performs the process described hereinafter:

Terminal 101, such as a mobile phone with camera 102 or a computer webcam, captures a visual object 120 representing physical objects such as man with a shirt 124 or an apartment wall 122.

The Capturing can be performed in several ways:
  Taking a photograph
  Recording a video
  Continuously capturing an image while local or remote processing provides real time feedback such "color not decided" or "a problem was found". The continuous capturing can be done while moving the camera such as moving in the directions shown in 103.

Said visual object can be captured from a static camera placed in the marketplace or from a camera held by person 112. Person 112 can be a crowd of people that were incentivized to capture the object.

Figure 2:
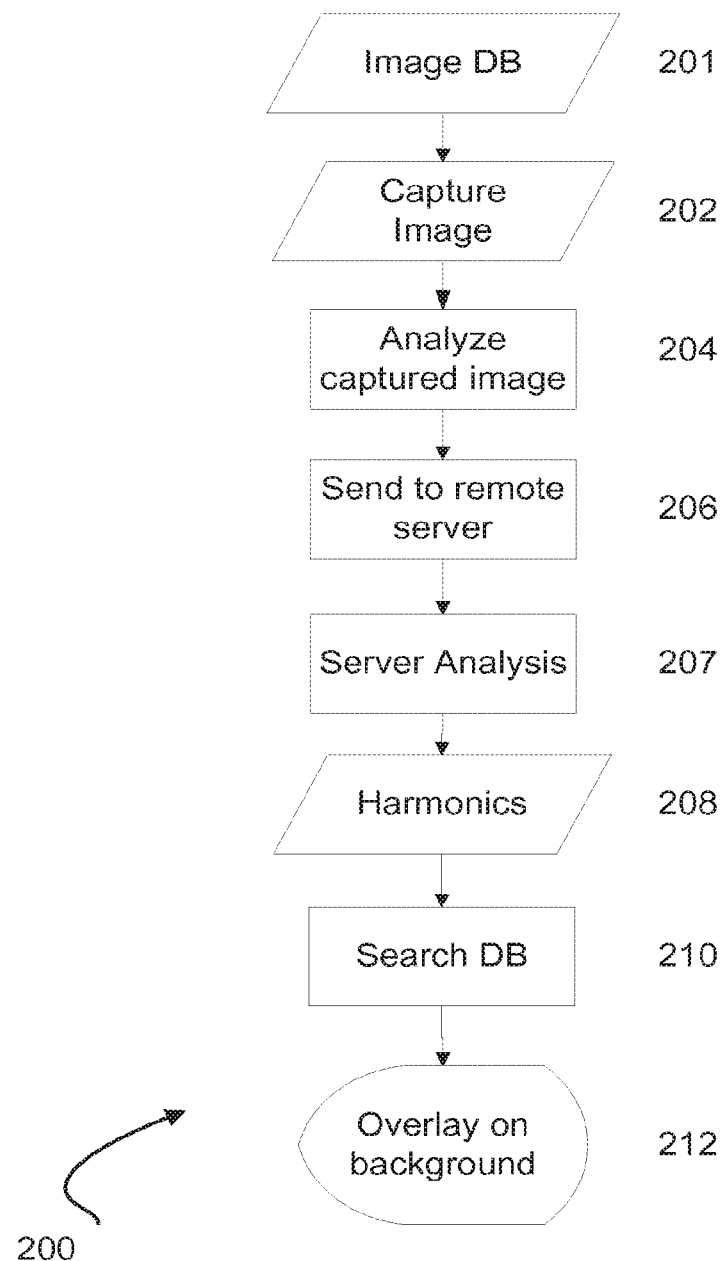
FIG. 2 is a flowchart of acts performed in capturing and matching a visual object, in accordance with an exemplary embodiment of the invention.

Said visual object can be processed locally using terminal 101 or it can be sent to a remote server 108, as further described in step 206 in FIG. 2, over a network 106, such as the internet.

Server 108 or device 101 calculates a color feedback 140 that is sent over the internet or created locally. Feedback 140 shows:
  Main colors found 141 on the visual object using steps 204 to 207 as further described in FIG. 2.

An option to select further images of the image DB, as further described in step 201 in FIG. 2, according to different color harmonies using one or more of the main colors found:
  Complementary colors 142 for color harmony further described in FIG. 4;
  Analogous colors 144 for color harmony further described in FIG. 5;
  Triadic colors 146 for color harmony further described in FIG. 6;
  Split-complementary colors 148 for color harmony further described in FIG. 7;
  Tetradic colors 150 for color harmony further described in FIG. 8; and,
  Square colors 152 for color harmony further described in FIG. 9.

An example would be that a person takes a photo of green wall using a mobile device camera 102 or computer webcam, in which green is found as the main color. The user selects complementary colors 142 and wall art having red as its main color is presented for the user to choose. One or more of the matching wall art can later be presented on the terminal display 101 to demonstrate the results to the user comprising red art on the green wall.

Method of Capturing and Matching a Visual Object's Colors

FIG. 2 is a flowchart of acts performed in capturing and matching a visual object, in accordance with an exemplary embodiment of the invention.

The flowchart describes a process and system 200 to capture and match visual objects.

An image database (DB) is loaded 201, including photos of a plurality of visual objects from one or more sides. For example, a database of shirts and their main colors are extracted using color analysis techniques of the present invention. Visual object representative 120 is then captured 202 using a mobile device camera 102 or computer webcam. The captured object is optionally analyzed 204 locally, as further described in step 207, to get a match using color or color harmonics analysis or to reduce the size of the data to be sent to remote or local servers in step 206.

Optionally the image itself or a processed part of it is sent 206 to a remote server 108 or locally processed on a server at device 101. The server performs color analysis 207 to generate color feedback 140. Such analysis uses the visual object and optionally other data, such as GPS data, the history of the sender, history of similar types of visual objects, and predefined categories. Main colors found in the visual object are displayed on color feedback 140.

In case the user manually selects harmonics 208, then the main colors found in steps 204-207 are used to find images in the Image DB 210 that fit the relevant harmonics (i.e. complementary, analogous, triadic, split-complementary, tetradic, or square color matches). In case user does not manually select harmonics, a sample from each harmonic is displayed to the user, and then he/she chooses the harmonic he/she prefers. Feedback disclosing results of the harmonic colors that match the visual object of interest is then displayed in step 212 using device such as 101. The feedback report 140 may comprise various forms. For example, the harmonic color(s) may be displayed on top of the original image captured in step 202. Optionally, further commercial ads are displayed in step 212 on device 101 in addition to the color match.

Optionally a straight forward search of an object of the same color and/or tone is performed and displayed as well.

FIG. 3 is a scheme describing a color wheel in accordance with an exemplary embodiment of the invention.

Color wheel 300 is comprised of 12 colors 302-324. The color wheel can further include more colors to create a continuum of hues between every pair of hues. The wheel is further divided by imaginary line 330 into warm colors 340 and cool colors 350.

FIG. 4 is a scheme describing selecting a complementary color 142 in accordance with an exemplary embodiment of the present invention.

Using color wheel 300, which is comprised of 12 colors 302-324, as described in FIG. 3.

The color red 302 is the base color; hence the color green 314, that is the opposite color on the color wheel, is selected as the complementary color.

FIG. 5 is a scheme describing the selection of analogous colors 144 in accordance with an exemplary embodiment of the invention.

Using color wheel 300, which is comprised of 12 colors 302-324, as described in FIG. 3.

The color red 302 is the base color; hence colors red-orange 304 and red-violet 324, which are next to it on the color wheel, are selected as analogous colors.

FIG. 6 is a scheme describing the selection of triadic colors 146 in accordance with an exemplary embodiment of the invention.

Using color wheel 300, which is comprised of 12 colors 302-324, as described in FIG. 3.

The color green 314 is the base color; hence colors orange 306 and violet 322, which evenly spaced from it on the color wheel, are selected as the triadic colors.

FIG. 7 is a scheme describing the selection of split complementary colors 148 in accordance with an exemplary embodiment of the invention.

Using color wheel 300, which is comprised of 12 colors 302-324, as described in FIG. 3.

The color green 314 is the base color; the color red 302 is its complementary color; hence colors red-orange 304 and red-violet 324, which are adjacent to 302 on the color wheel, are selected as the complementary colors.

FIG. 8 is a scheme describing the selection of tetradic colors 150 in accordance with an exemplary embodiment of the invention.

Using color wheel 300, which is comprised of 12 colors 302-324, as described in FIG. 3.

The color red 302 is the base color; the color orange 306 is 90 degrees right to it on the color wheel and is selected as the second color of the tetradic; the color green 314 is 90 degrees to 306 and is selected as the third color, and finally the color blue 318 is 90 degrees to 314 and is selected as the fourth color of the tetradic.

FIG. 9 is a scheme describing the selection of square colors 152 in accordance with an exemplary embodiment of the invention.

Using color wheel 300, which is comprised of 12 colors 302-324, as described in FIG. 3.

The color red 302 is the base color; the colors yellow-orange 308, green 314, and blue-violet 320 are selected such as to create a perfect square on the color wheel with its colors spaced evenly on the color wheel.

Mobile Application

The present invention further comprises a software application loaded onto the User's terminal 101 (e.g. a mobile communications device, such as a smartphone) configured to communicate with the system server 108, such as over a wireless communications network. The application may be native or web based. The User's device enables the User to instantly transmit an image or a visual descriptor of the visual object 120 to the system server 108, and to receive notifications from the system server 108 with the identified colors of the image analysis. The terminal 101 of the present invention may further comprise image capture and processing modules that enable the User to locally analyze the image and view the identified colors without having to electronically communicate with the system server 108.

Computer Program

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method for overlaying visual items, comprising:
    using a camera of a client terminal for capturing one or more visual object images;
    identifying at least one visual object image in said one or more visual object images which are captured using said client terminal;
    conducting a color analysis to identify at least one main color in said at least one visual object;
    querying an image database against said at least one main color to select at least one stored image;
    as real time feedback to said querying adding said at least one stored image as an overlay on top of at least part of said at least one visual object in a display of said client terminal.

2. The method of claim 1, wherein said color analysis is conducted to identify color harmonics data, said querying is done against said color harmonics data and said at least one main color.

3. The method of claim 1, further comprising displaying said overlay on top of said at least one visual object on a display of said client terminal.

4. The method of claim 1, wherein said conducting a color analysis comprises determining said main Colors by identifying Base, Primary, Secondary and Tertiary Colors of said visual object.

5. The method of claim 2, further comprising determining said color harmonics data based on a color wheel.

6. The method of claim 2, wherein said color harmonics data comprises a member of a group consisting of: said visual object's Complementary Color, Analogous Colors, Triadic Colors, Split-Complementary Colors, Tetradic Colors, and Square Colors.

7. The method of claim 1, wherein said color analysis comprises separating a visual object from a background in said at least one visual object image for compensating for distortions.

8. The method of claim 1, wherein said color analysis comprises imaging processing techniques selected from the group consisting of: HSV (Hue, Saturation, Value) color histograms, RGB color histograms, CYMK color histograms, and multi-space color clustering.

9. The method of claim 1, wherein said terminal device is a mobile device and said at least one visual object image are part of a plurality of visual object images continuously captured while said conducting, said querying, and said adding are executed by said device terminal.

10. The method of claim 1, wherein said at least one visual object image images a visual object selected from a group consisting of: a home furnishing, a clothing item, internal and an external wall covering, and a hair color.

11. The method of claim 1, herein conducting a color analysis comprises conducting a location analysis of said client terminal to acquire location data generated by a module of said client terminal said querying is done against said location data and said at least one main color.

12. The method of claim 1, wherein said querying comprises conducting an analysis of said at least one object to identify a fit between color distributions of said at least one stored age and said at least one visual object.

13. The method of claim 1, wherein said querying comprises conducting an analysis of said at least one object to identify a fit between at least one of texture, shape, and edge histogram of said at least one stored image and said at least one visual object.

14. The method of claim 1, wherein said querying comprises conducting an analysis of said at least one object to identify a face similarity between faces in said at least one stored image and said at least one visual object.

15. A non-transitory computer readable medium having embodied thereon a program, the program being executable by a processor for performing a method for overlaying visual items, the method comprising:

using a camera of a client terminal for capturing one or more visual object images;

identifying at least one visual object image in said one or more visual object images which are captured using said client terminal;

conducting a color analysis to identify at least one main color in said at least one visual object;

querying an image database against said at least one main color to select at least one stored image;

as real time feedback to said querying adding said at least one stored image as an overlay on top of at least part of said at least one visual object in a display of said client terminal.

16. An internet connected system for overlaying visual items, comprising:

an interface adapted for receiving from one or more capturing devices at least one visual object image identified in one or more visual object images captured using one or more cameras of said one or more capturing devices;

an image database storing a plurality of images;

a program store storing code;

a processor coupled to the interface, the image database, and the program store for implementing the stored code, the code comprising:

code instructions for conducting a color analysis to identify at least one main color in said at least one visual object;

code instructions for querying said image database against said at least one main color to select at least one stored image;

code instructions for providing as a real time feedback to said querying instructions for adding said at least one stored image as an overlay on top of at least part of said at least one visual object on one or more displays of said one or more capturing devices.

17. The system of claim 16, wherein said processor is adapted for implementing code instructions to determine color harmonics data of said at least one visual object image, wherein said color analysis is based on said color harmonics data.

18. The system of claim 17, wherein said color harmonics data is determined using a color wheel and said color harmonics data, comprises a member of a group consisting: said object's Complementary Color, Analogous Colors, Triadic Colors, Split-Complementary Colors, Tetradic Colors, and Square Colors.

19. The system of claim 16, wherein said color analysis comprises, separating in said at least one visual object image at least one visual object from a background for compensating for light distortions.

20. The system of claim 16, wherein said color analysis comprises imaging processing techniques selected from the group consisting of: HSV (Hue, Saturation, Value) color histograms, RGB color histograms, CYMK color histograms, and multi-space color clustering.

* * * * *